United States Patent
Pfister et al.

(10) Patent No.: US 10,317,312 B2
(45) Date of Patent: Jun. 11, 2019

(54) METHOD FOR REDUCING VIBRATIONS IN A TEST BED

(71) Applicant: AVL LIST GMBH, Graz (AT)

(72) Inventors: Felix Pfister, Graz (AT); Stefan Jakubek, Vienna (AT); Andreas Fleck, Maria Enzersdorf (AT)

(73) Assignee: AVL LIST GMBH, Graz (AT)

(*) Notice: Subject to any disclaimer, the term of this patent is extended or adjusted under 35 U.S.C. 154(b) by 646 days.

(21) Appl. No.: 14/895,380

(22) PCT Filed: May 30, 2014

(86) PCT No.: PCT/EP2014/061262
§ 371 (c)(1),
(2) Date: Dec. 2, 2015

(87) PCT Pub. No.: WO2014/195238
PCT Pub. Date: Dec. 11, 2014

(65) Prior Publication Data
US 2016/0116367 A1    Apr. 28, 2016

(30) Foreign Application Priority Data
Jun. 3, 2013    (AT) .............................. A 50369/2013

(51) Int. Cl.
G01M 7/02    (2006.01)
G01M 13/02    (2019.01)

(52) U.S. Cl.
CPC .............. *G01M 7/022* (2013.01); *G01M 7/02* (2013.01); *G01M 13/02* (2013.01)

(58) Field of Classification Search
CPC ...... G01M 7/022; G01M 7/025; G01M 7/045; G01M 13/02; G01M 13/025; G01M 7/02
See application file for complete search history.

(56) References Cited

U.S. PATENT DOCUMENTS 3,693,402 A * 9/1972 Jones .................... G01M 7/045
                                                                    73/11.05
4,211,105 A * 7/1980 Szabo ................... G01M 7/025
                                                                    73/11.05
(Continued)

FOREIGN PATENT DOCUMENTS

EP        0280948      9/1988
JP     2005212706      8/2005
(Continued)

OTHER PUBLICATIONS

English Translation of EP0280948.*
(Continued)

Primary Examiner — Helen C Kwok
(74) Attorney, Agent, or Firm — Dykema Gossett PLLC

(57) ABSTRACT

In order to reduce the excitation of vibrations and resonances in a test bed for a real component and a virtual component, one of the following method steps is provided: a) determining a first correction value ($K_1$) from the measured variable (M), wherein the first correction value ($K_1$) is added to the measured variable (M) and the sum is communicated as a corrected measured variable (M*) to the virtual component for calculating the control variable (S), b) determining a second correction value ($K_2$) from the calculated control variable (S), wherein the second correction value ($K_2$) is added to the calculated control variable (S) and the sum is transferred as a corrected control variable (S*) to the actuator, c) determining a third correction value ($K_3$) from the measured variable (M), wherein the third correction value ($K_3$) is used to modify a parameter (P) of the equation of movement.

18 Claims, 3 Drawing Sheets

(56) References Cited

U.S. PATENT DOCUMENTS

| | | | | |
|---|---|---|---|---|
| 4,395,904 | A * | 8/1983 | Ivanov | G05D 19/02 |
| | | | | 318/617 |
| 5,816,046 | A * | 10/1998 | Paeth | B60K 23/02 |
| | | | | 60/469 |
| 6,637,271 | B1 * | 10/2003 | Vennefron | F15B 7/00 |
| | | | | 60/469 |
| 6,754,615 | B1 | 6/2004 | Germann et al. | |
| 2006/0282197 | A1 * | 12/2006 | Schoggl | F02D 41/1406 |
| | | | | 701/1 |
| 2007/0260373 | A1 | 11/2007 | Langer et al. | |
| 2010/0088058 | A1 | 4/2010 | Fricke | |

FOREIGN PATENT DOCUMENTS

| | | |
|---|---|---|
| JP | 200894197 | 4/2008 |
| JP | 201315447 | 1/2013 |

OTHER PUBLICATIONS

English Abstract of EP0280948.
K. Szabat et al., "Robust Control of the Two-Mass Drive System Using Model Predictive Control" in *Robust Control, Theory and Applications*, InTech, Poland, Apr. 2011.
English Abstract of JP2005212706.
English Abstract of JP200894197.
English Abstract of JP201315447.

* cited by examiner

METHOD FOR REDUCING VIBRATIONS IN A TEST BED

CROSS-REFERENCE TO RELATED APPLICATIONS

This application is a national stage filing based upon International PCT Application No. PCT/EP2014/061262, filed 30 May 2014, which claims the benefit of priority to AT application No. A50369/2013, filed 3 Jun. 2013.

FIELD OF THE INVENTION

The subject invention relates to a method for reducing the excitation of undesired vibrations and resonances in a test bed for a real component and a virtual component, wherein the real component provides a measured variable of the real component to the virtual component and receives from the virtual component a control variable for an actuator of the test bed, wherein in the virtual component, a simulation model with an equation of motion is implemented, which determines the control variable from the measured variable.

BACKGROUND

In automotive technology, the process of testing is often carried out in such a way that real components, such as for example real internal combustion engines, real tyres, real transmissions, real batteries, real steering systems, real power trains, real vehicles etc. are arranged on test beds. This real component to be tested frequently also determines the name of the test bed. Thus, one speaks of engine test beds, tyre test beds, transmission test beds, vehicle test beds etc. These test beds allow for example the development of internal combustion engines, of vehicle components or the detection of errors in networked vehicle control units, which may have an effect on the overall behaviour of the vehicle. The testing is here a process that is used to obtain greater certainty as to whether technical objects, technical systems or technical products and processes, the real component or the virtual component, operate within certain boundary conditions and/or whether certain characteristics and/or requirements are met. Tests carried out therefore always simulate or anticipate real processes in simulated environments. In the most general case, the simulated environment exchanges with the tested real component material flows (e.g. a media flow such as oil, water etc.), energy flows (e.g. electric current/voltage, rotary speed/torque etc.) and information flows (e.g. measured data etc.) and in this way allows technical processes to be examined without requiring, affecting or compromising the future real environment of the real component. Therefore, a test result will never be perfectly valid, but will always be an approximation. The quality of the approximation depends, inter alia, on the quality of the simulated environment and on the quality that can be achieved when simulating the exchange of energy, information and material flows that occur in the real world. This simulated environment will be referred to below as a virtual component. The real component and the virtual component will jointly be referred to as a test object. The test object and the test bed are also frequently jointly referred to as Hardware-In-The-Loop-System (HiL System) or more specifically as "X-In-The-Loop-System," wherein X denotes the respective test object.

A virtual component consists of simulation models which are substantially implemented as software with implemented algorithms as well as mathematical or physical models, which are run on a simulation unit, generally a computer.

Also for carrying out the test, actuators (a number of actuators) and sensors (a number of sensors) will normally be present on the test bed, as well as possibly a flow control (e.g. a test bed control unit, an automation unit etc.) and periphery (such as e.g. a data logger etc.). The sensors measure physical, chemical or information-related states or state changes ("measured variables") of the real component and the actuators impose certain chemical, physical or Information-related states or state changes ("set points") on the real components. Actuators are therefore the signal conversion counter-piece of sensors. Actuators and sensors link the real world with the virtual world of the test object, i.e. the real component and the virtual component. Examples of actuators are electric, pneumatic or hydraulic load units for imposing rotary speeds, torques, velocities or distances, controllable electrical resistors, oil conditioning systems, air conditioning systems etc. Examples of sensors are torque sensors and rotary encoders.

The real component, the virtual component, actuators and sensors are dynamic systems with certain response behaviour. Thus, also a Hardware-In-The-Loop-System is, as an interconnection of these components, a dynamic system.

An example of a test is a virtual test drive of a hybrid vehicle (internal combustion engine and electric motor) along the Großglockner High Alpine Road under a realistic simulation of humidity, air temperature, rotary speed and torque behaviour of the real component "internal combustion engine," which is arranged on an engine test bed. It is assumed that the aim of this test drive is the evaluation of the dynamic behaviour of the electric motor as well as the temperature behaviour of the traction battery, which are simulated as a virtual component, for a certain type of driver, e.g. a sporty driver with an aggressive gear-changing behaviour. The test route (here the Großglockner High Alpine Road), the driving behaviour as well as the driving environment are also simulated. During this test drive, the Hardware-In-The-Loop-System is set into vibration by the unevenness of the road, by gusts of wind, by the driver's braking and steering activities and/or by combustion shocks. However, these vibrations will probably not be exactly identical with the vibrations occurring during a real drive with the hybrid vehicle over the Großglockner High Alpine Road, due to the dynamic behaviour of the sensors and actuators and due to the simulation accuracy of the virtual component, which is always limited on account of it being a simulation.

Another example is shown in EP 1 037 030 B1, which discloses a method for simulating the behaviour of a vehicle on a road on a power train test bed, wherein a vehicle model and a tyre model (virtual components) are used for the simulation.

In practice, the virtual components are often retrofitted to existing test bed infrastructures. In this way, a conventional, traditional test bed, which so far could impose only simple set point profiles, becomes an efficient X-In-The-Loop test environment, which allows the implementation of new test tasks, such as for example the above-described drive on the Großglockner High Alpine Road under different boundary conditions. The existing test bed actuators and test bed sensors with their underlying dynamic subsystems and control structures are often supposed to remain unchanged (e.g. for cost reasons) or are unknown to the supplier of the virtual component. The same virtual component is often also used on different test beds with different dynamic response behaviours or on different test bed types. It also occurs that a virtual component is replaced with another virtual component (e.g. with modified models).

A further problem in connection with such virtual components can develop on a test bed if the virtual components are to represent extreme load cases that reach or exceed the limits of the implemented actuators, sensors or the real component.

Due to the dynamic response behaviour of the actuators and sensors integrated in the test bed, but also due to the interferences that are always present in the available measurements (e.g. measurement noise, limited resolution etc.), frequently undesired, unexpected and unrealistic vibration and resonance phenomena of the dynamic overall system occur, which can have a negative influence on the test results and may in an extreme case cause the use of the virtual components to fail altogether.

Conventionally, this scenario could be counteracted by using filters (e.g. Bessel filters, Butterworth filters, etc.) for attenuating vibrations which, however, limits the available dynamics of the test bed, which is not desired. In this case, it would no longer be possible to carry out test situations with strong dynamics, e.g. a very rapid change of rotary speeds or torques. A further important negative characteristic that occurs if such filters are used is the distortion of important dynamic states during testing. As an example, the angular momentum on mechanical/rotary test beds (e.g. power train) could be mentioned, which is exchanged between the real and the virtual component. The use of filters causes here the real applied rotary momentum (e.g. from the internal combustion engine) to be incorrectly introduced into the virtual component, which consequently leads to incorrect test results (e.g. an excessively high/excessively low fuel consumption). Filters moreover also always cause a phase shift which, inter alia, has a negative influence on the stability reserve of the HiL system.

BRIEF SUMMARY OF THE INVENTION

It is therefore an object of the subject invention to provide a method that can be used to operate the virtual components on test beds as far as possible without limiting the dynamic behaviour and as far as possible without any undesired vibration and resonance effects.

This object is achieved by determining a first correction value at least from the measured variable, which is added to the measured variable, and the sum is transferred as a corrected measured variable to the virtual component for calculating the control variable, or a second correction value is determined from the calculated control variable, which is added to the calculated control variable, and the sum is transferred as a corrected control variable to the actuators, or a third correction value is determined, which modifies a parameter of the equation of motion. However, the first, second or third correction value can also be combined as desired.

Thus, any undesired vibration and resonance effects on the test bed can be effectively suppressed, largely without limiting in so doing the dynamics of the test bed and without intervening with the underlying control structure of the actuators or with the sensors of the test bed. This also allows the retrofitting of existing test environments with virtual components or the replacement of virtual components with other virtual components, without in so doing having to modify the existing test bed infrastructure (sensors, actuators) in any way. Thus, any desired system-dynamic interventions in the test bed can be carried out by intervening in or adding to the virtual components, and above all independently of the existing test bed infrastructure.

Particularly advantageously, the torque of a shaft between the real component and the actuator is used as the measured variable. This allows the "forming" of the torques measured on the test bed by virtual additional momenta, so that the additional torque imposed on the virtual world continuously (as a function of time) changes in a suitable manner, so that no undesired vibrations occur in the virtual system.

Also, a rotary speed is advantageously used as the control variable. The rotary speeds resulting in the virtual world of the simulation are "transformed" in a suitable manner, so that no undesired vibrations or resonances occur in the real system.

The correction values can advantageously be determined by optimising a target function with respect to the correction value. Such target functions can be optimised using known mathematical methods, preferably on real-time computers in real time.

For determining the first or third correction value, a linear combination of a first and second target functions is preferably optimised, because in this way different, physical effects of similar influencing variables, such as e.g. energy or rotary momentum, can be taken into account. To this end, as the first or third target function, a square objective function is advantageously used as a function of the angular speed or a derivative thereof. The second target function is advantageously used to evaluate the rotary momentum introduced by the first or third correction value or the modified kinetic energy, as a result of which it is ensured that the correction does not evoke any excessively great falsifications of the rotary motion or of the energy balance or of the momentum equations of the shaft.

For determining the second correction value, a target function is preferably implemented that evaluates the deviation between the control variable calculated in the virtual component and the actual value of this control variable.

It is advantageous for many test bed types, such as e.g. power train test beds or engine test beds, to determine as a first correction value a correction torque and/or to determine as a second correction value a correction rotary speed. The torque and the rotary speed are the usual measured and control variables in such test beds and are usually available as measurement values, so that their use would be advantageous.

As a third correction value, a mass-related parameter of the equation of motion is used, such as e.g. an inertia moment or a mass, by means of which the virtual component can be influenced in a simple manner via the equation of motion.

Particularly advantageously, boundary conditions for considering specified limitations of the virtual component or of the real component or of the actuators can be taken into account for the optimisation. In this way, physical limits of the test bed can be taken into account, which also constitutes an effective protection of the components of the test bed against any damage, e.g. by excessively high torques, accelerations, rotary speeds etc. Apart from the optimisation of the target functions, the optimisation algorithm will in this case typically take into account equality or inequality limitations. As a result, in particular in the case of demanding test scenarios (e.g. when driving over bumps or barriers), on the one hand any undesired vibrations in the HIL system can be reduced, on the other hand any limitations of the test bed can definitely be adhered to, whilst at the same time maximising the claim of reality.

BRIEF DESCRIPTION OF THE DRAWINGS

The subject invention will be explained in more detail below with reference to FIGS. 1 to 4, which show by way of example, schematically and without limitation, advantageous embodiments of the invention, wherein.

DETAILED DESCRIPTION OF EMBODIMENTS OF THE INVENTION

Figure 1:
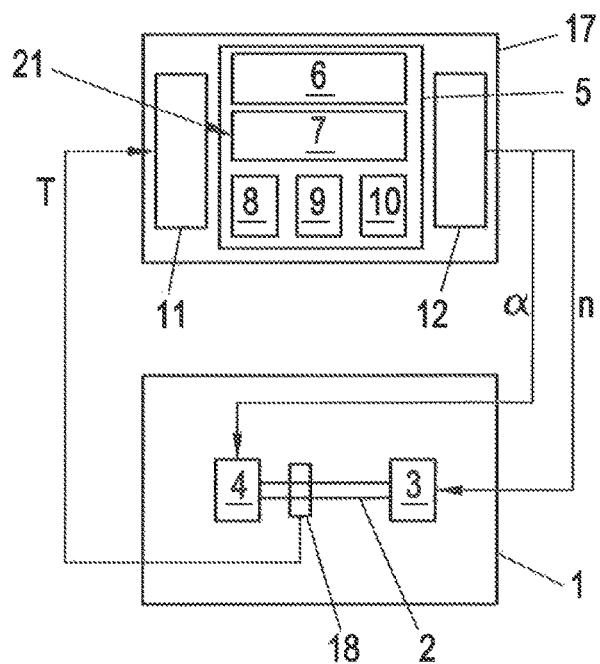
FIGS. 1 and 2 show examples of a configuration of a Hardware-In-The-Loop test environment.

FIG. 1 shows the principal configuration of a Hardware-In-The-Loop test environment. On a test bed 1, e.g. an engine test bed, a real component 4 is provided, e.g. an internal combustion engine that is connected to an actuator 3 via a connection shaft 2, e.g. a load machine in the form of an electric dynamometer. The virtual component 5 comprises a simulation model 21, e.g. a vehicle simulation model 6, an environment simulation model 7, a driver simulation model 8, a road simulation model 9, a wheel simulation model 10 etc., which run as software in a simulation device 17, e.g. in the form of a computer with required software and implemented algorithms. Depending on the test run, different and several such component simulation models may be used, which together form the simulation model 21. In the virtual component 5, the vehicle or a component thereof is moved through a virtual world. The real component and the virtual component interact via input interfaces 11 (data from the sensor 18) and output interfaces 12 (data to the actuator). On the test bed 1, the respective current virtual state is adjusted on the real component 4 and on the actuator 3 under control of the virtual component 5, so that the real component 4 experiences the states from the virtual component 5, i.e. the virtual world, and is tested with the time sequence of these states.

To this end, e.g. the torque T between the real component 4 and the actuator 3 or the rotary speed n of the real components or of the actuator 3 (e.g. In the form of an electric load machine) is measured on the test bed by means of suitable sensors 18, e.g. by means of a torque measurement unit on the connection shaft 2 or a rotary speed measurement unit of the simulation unit 17, and is made available to the virtual component 5 via an input interface 11. From this measurement variable M (torque T or rotary speed n), the simulation model 21 in the simulation unit 5 calculates, normally after some suitable signal processing, a control variable S for the actuator 3, e.g. a desired rotary speed n, a control variable for the real component 4, e.g. a throttle position α, etc. These control variables S are transferred to the test bed 1 via an output interface 12 of the simulation unit 17 and are adjusted on the test bed 1 by the actuator 3 and, if appropriate, further suitable actuators (not shown), if desired by means of suitable control units.

However, the measured variable in terms of the subject method does not need to be measured directly, but can be derived or formed from other measured variables, e.g. in the virtual component 5. An example of this is a torque estimator as is per se known, which estimates the torque T of the connection shaft 2 by means of the actually measured rotary speed n of the connection shaft 2 or of the actuator 3 connected thereto. As a rule, it is not the directly measured signal that is used as the measured variable, but an appropriately processed (e.g. filtered) signal.

Figure 2:
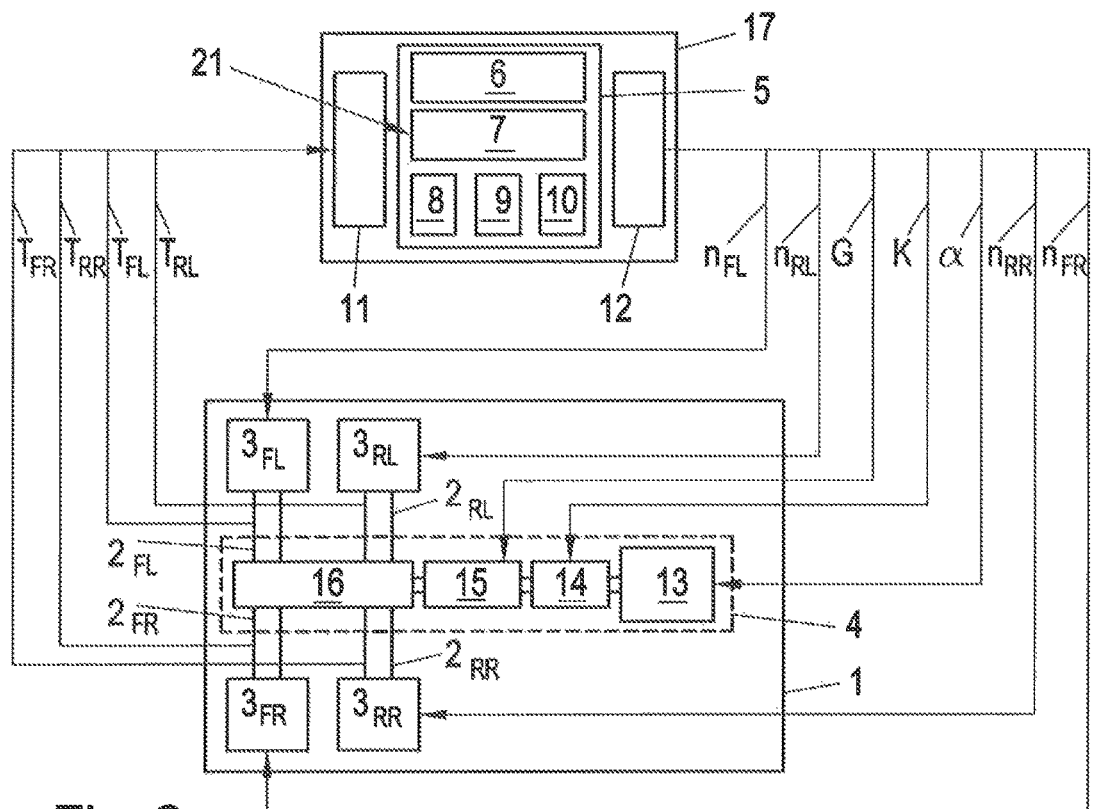

FIG. 2 shows a further example of a Hardware-In-The-Loop test environment for a power train as a real component 4. To this end, the entire power train is built up on the test bed 1. The power train comprises here an internal combustion engine 13, a clutch 14, a transmission 15 and a differential gear 16. The connection shafts $2_{FL}$, $2_{FR}$, $2_{RL}$, $2_{RR}$ are here formed by the half-shafts of the power train and are connected to actuators $3_{FL}$, $3_{FR}$, $3_{RL}$, $3_{RR}$, e.g. in the form of electric load machines (dynamometer). For the virtual component 5, the torques $T_{FL}$, $T_{FR}$, $T_{RL}$, $T_{RR}$ of the connection shafts $2_{FL}$, $2_{FR}$, $2_{RL}$, $2_{RR}$ are here detected and the virtual component 5 calculates, using the simulation model 21 implemented therein, the control variables for the real component 4, here for the internal combustion engine 13 (e.g. the throttle position α), the clutch 14 (e.g. a clutch signal K) and the transmission 15 (e.g. a gear signal G), and the control variables for the actuators $3_{FL}$, $3_{FR}$, $3_{RL}$, $3_{RR}$, here rotary speeds $n_{FL}$, $n_{FR}$, $n_{RL}$, $n_{RR}$. A test run in the Hardware-In-The-Loop test environment works here in the same way as described above with reference to FIG. 1.

Of course, also other configurations are conceivable for a real component 4, wherein the basic design of the Hardware-In-The-Loop test environment and the run of a test in the Hardware-In-The-Loop test environment remain unchanged.

In the simulation model 21 of the virtual component 5, one (or more) control variables S are calculated for the actuators 3 from the measurement variable M, e.g. one (or more) torques T of one (or more) half-shafts or of a connection shaft 2, from the sensors 18 of the test bed 1. However, this torque T may also be just an estimated torque or a torque calculated on the basis of the measured values from other sensors. To this end, an equation of motion with at least one parameter P, e.g. in the form of a differential algebraic equation, is implemented in the simulation model 21, which is resolved several times per second, e.g. every millisecond. However, also a plurality of equations of motion may be implemented, e.g. a system of coupled equations of motion. In general, S=f(P,M) applies.

Figure 3:
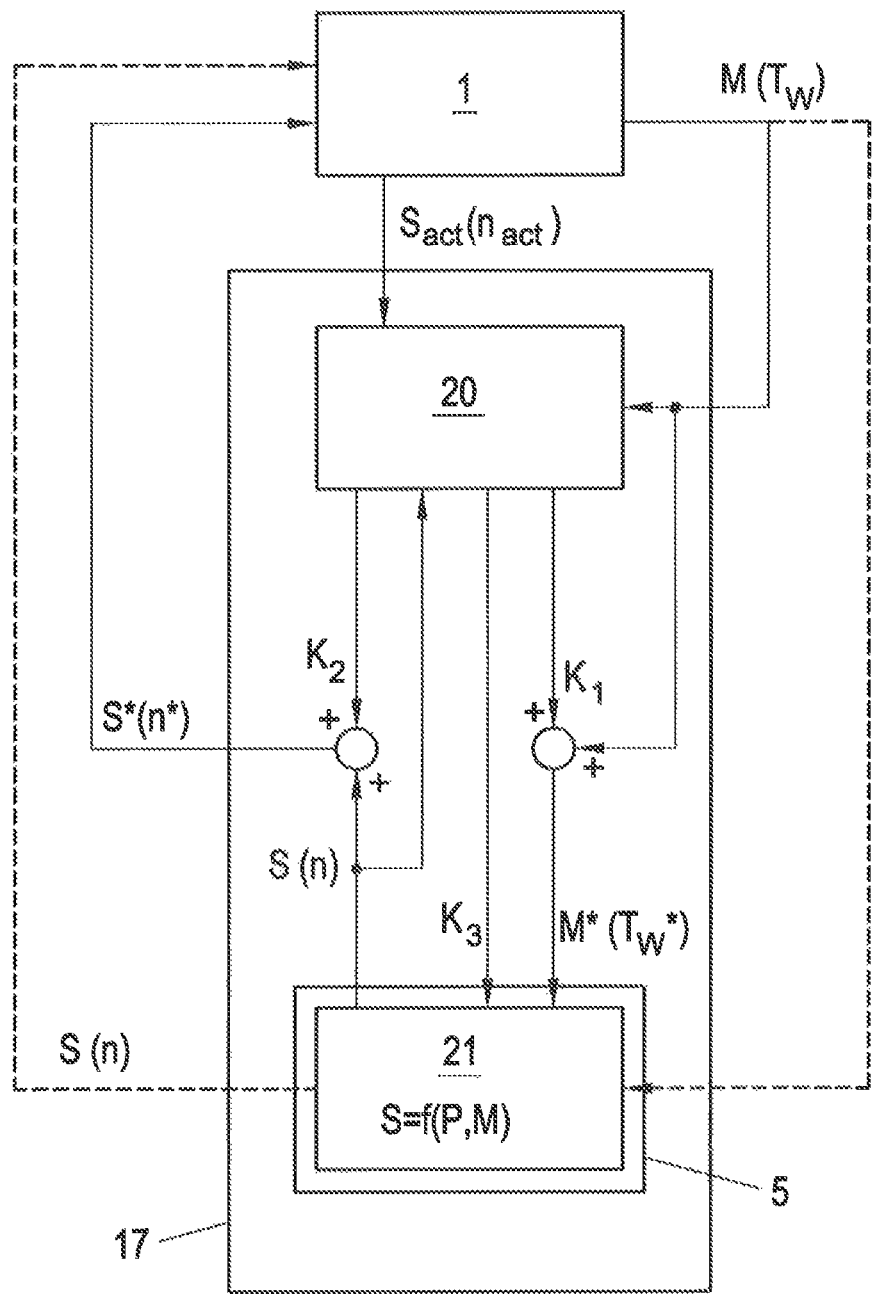
FIG. 3 shows the correction of the measurement variable or the control variable according to the invention.

In the simulation device 17, a correction unit 20 is provided (FIG. 3), which calculates a first correction value $K_1$ from the appropriately processed measured variable M, e.g. a shaft torque $T_W$, preferably at any point of time in which the equation of motion is resolved (e.g. by a numerical integration of the differential equations of motion), which correction value $K_1$ moderates the virtual component 5 in a suitable manner and compensates as best as possible any undesired resonance phenomena that result from the imperfection of the test bed 1, in particular of the actuator 3 and the sensor 18. The first correction value $K_1$ is therefore a continuously changing signal and is added, with its correct sign, to the measured variable M, here the torque $T_W$, and the sum of the measured variable M and the correction value $K_1$ is fed into the virtual component 5 as a corrected measurement value M*, here a corrected shaft torque $T_W^*$, for calculating the control variable S for the actuator 3.

This "Torque Shaping" is carried out without any intervention in the overall structure of the test bed 1, i.e. in particular without any intervention in the control structure of the test bed 1.

The described approach according to the invention can be extended to any dynamic systems, wherein in this case other physical variables, such as e.g. electrical voltage, mechanical force etc., may be used as the measured variable M and the control variable S instead of torque and rotary speed.

Alternatively or in addition, the correction unit 20 calculates from the calculated control variable S, here e.g. the rotary speed n, a second correction value $K_2$ for the actuator 3, which is added to the calculated correction variable S, and the sum is made available to the actuator 3 for adjustment on the test bed 1 as a corrected control variable S*, here a corrected rotary speed n*. The second correction value $K_2$ is preferably again re-calculated at any point in time in which the equations of motion are resolved, and again constitutes a continuously changing signal. This corrected control variable S* has the task of keeping away from the real component 4 on the test bed 1 any undesired vibration effects that may occur due to the imperfect response behaviour of the actuator 3.

This "Speed Shaping" is again carried out without any intervention in the overall structure of the test bed 1, i.e. leaves in particular the control structure of the test bed 1 unchanged.

Alternatively or additionally, the correction unit 20 calculates from the measured variable M a third correction value $K_3$ that is used for changing a parameter P of the equation of motion in the virtual component 5, preferably for modifying a system inertia (e.g. the wheel inertia or the vehicle inertia) or a mass (e.g. the vehicle mass). This corrected parameter P has the task of suppressing any undesired vibration effects of the virtual component 5 and thus, in consequence, also of the real component 4.

This "Parameter Shaping" is here carried out again without any intervention in the overall structure of the test bed 1, i.e. in particular without influencing the controller structure of the test bed 1.

Possible methods for determining the correction values $K_1$, $K_2$ and $K_3$ will be explained below by way of example.

In general, in the methods formulated by way of example below, a target function J is implemented in the correction unit 20 as a function of the first or Second or third correction value $K_1$, $K_2$, $K_3$, which is optimised, here minimised, with respect to the first, second or third correction value $K_1$, $K_2$, $K_3$, i.e. in a general notation $$J(K_{1,2,3}) = \min_{K_{1,2,3}}.$$

Figure 4:
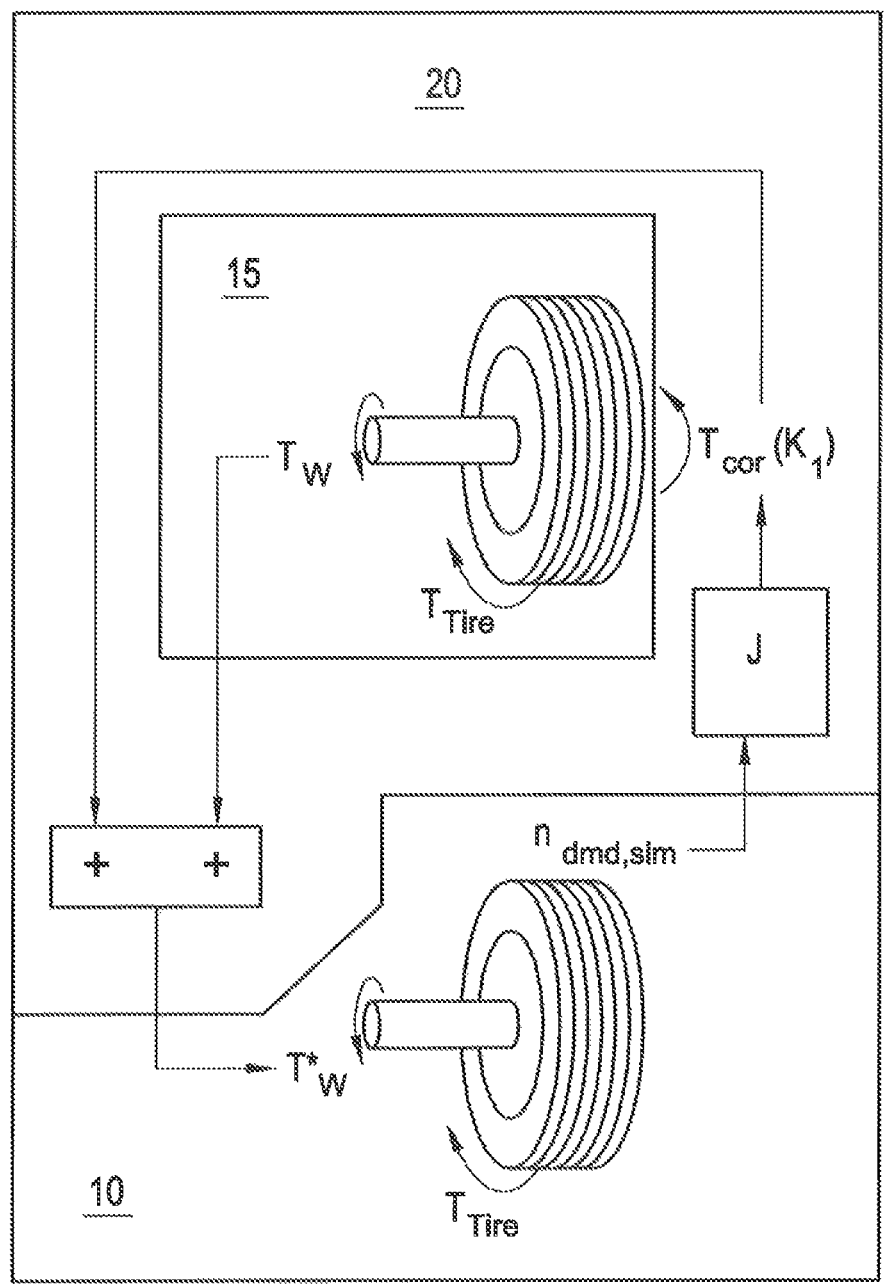
FIG. 4 shows the determination of the first correction value by the example of a wheel simulation model.

For determining the first correction value $K_1$, at least one simulation model 21 of a part of the vehicle that is connected to the real component 4 via a shaft is implemented in the virtual component 5, e.g. as in FIG. 4 a wheel simulation model 10 of a vehicle wheel that is connected to the half-shaft of a power train (real component 4 in FIG. 2), or a simulation model of a dual mass flywheel or of a clutch that is connected to the crank shaft of an internal combustion engine (real component 4 in FIG. 1). As measured variable M, the shaft torque $T_W$, and if necessary further measured variables such as temperature, are used each time, which is either measured directly or is estimated or calculated from other measured variables.

In the example of a wheel simulation model 10 as shown in FIG. 4, the measured shaft torque $T_W$ is used to determine the control variable S for the actuator 3 on the test bed 1, e.g. like here a rotary speed $n_{dmd,sim}$ for an electric load machine. The wheel simulation model 10 may here also be connected to other simulation models, such as e.g. a tire simulation model, a road simulation model etc., and can exchange data with these. The shaft torque $T_W$ is comprised of a tire torque $T_{tire}$ between the tire and the road, a brake torque $T_{brake}$ and further optional auxiliary torques $T_{opt}$, such as e.g. an electric drive torque in case of a wheel hub motor.

In the correction unit 20, a target function J is implemented as a function of the first correction value $K_1$, here in the form of a correction torque $T_{cor}$. This target function J is minimised with regard to the first correction value $K_1$, i.e. in the general notation $$J(K_1) = \min_{K_1}.$$

The thus determined correction value $K_1$ is added to the measured variable M from the test bed 1, here the shaft torque $T_W$, and the corrected measured variable M*, here a corrected shaft torque T*, is transferred to the wheel simulation model 10 of the virtual component 5 for determining the control variable S for the test bed 1.

To this end, a first target function $J_{energy}$ in the form of a square objective function could be implemented in the correction unit 20. To this end, e.g. a target function might be suitable which evaluates the jerk energy, e.g. in the form of the "effect of the jerk energy,"

$$J_{energy} = \frac{1}{2} J_W \int_{\tau=t}^{t+T} \|\dot{\omega}(\tau)\|_2^2 \, d\tau,$$

or the "effect of the acceleration energy", e.g. in the form $$J_{energy} = \frac{1}{2} J_W \int_{\tau=t}^{t+T} \|\omega(\tau)\|_2^2 \, d\tau.$$

By using the integration limits, calculations are carried out over a period of time T into the future, in order to counteract any future, expected states. Via the correction torque $T_{cor}$, a torque is added that also modifies the transferred angular momentum. To ensure that the simulation is not excessively falsified, the mean value over time of the angular momentum, which would cause a falsification of the rotary speed, is supposed to be as low as possible. Therefore, a second target function $J_{disto}$, e.g. in the form $$J_{disto} = \int_{v=0}^{t} \int_{\tau=0}^{v} \frac{T_{cor}(\tau, v)}{J_W} \, d\tau \, dv$$

is used, which evaluates the introduced angular momentum via the correction torque $T_{cor}$. The overall target function J to be minimised for the determination of the first correction value $K_1$ is then written as a linear combination of the first and second target functions with the weighting factors $\alpha_1$, $\alpha_2$, $J = \alpha_1 J_{energy} + \alpha_2 J_{disto}$. The sought correction torque $T_{cor}$ will then result from a minimisation of this target function with respect to the correction torque $T_{cor}$.

For the overall target function J, of course other or further target functions may be considered, e.g. both of the above energy/effect-based target functions could be considered. For carrying out the minimisation, the correction unit 20 needs at least the control variable for the load machine, here the rotary speed $n_{dmd,sim}$, for determining the angular speed $\omega$. The inertia moment of the rotating part $J_W$ (e.g. of the wheel or of the clutch) can be presumed to be known. The first correction value $K_1$, here the correction torque $T_{cor}$, can then be processed in the virtual component 5, e.g. in the wheel simulation model 10, as described above.

However, it may also be provided that in the correction unit 20, also a wheel simulation model 15, preferably the same one, is implemented. In this case, knowing the shaft torque $T_W$, the correction unit 20 can determine a corrected overall wheel torque $T^*_W$ using the determined correction moment $T_{cor}$ and can transfer it to the virtual component 5, as schematically shown in FIG. 4.

For the determination of the second correction value $K_2$, a target function J is implemented in the correction unit 20 as a function of the second correction value $K_2$, here in the form of a correction rotary speed $n_{cor}$. This target function J is minimised with regard to the second correction value $K_2$, i.e. in a general notation $$J(K_2) = \min_{K_2}.$$

As a target function, e.g. a function may be implemented that evaluates the deviation between the control variable S calculated in the virtual component 5 and the actual value of this control variable $S_{act}$, which can be measured, e.g. in the form $$J = \int_0^t \|S(\tau) - S_{act}(\tau)\|_2^2 \, d\tau.$$

Using the rotary speed n as the control variable S as an example, the target function J can be written as $$J = \int_0^t \|n_{dmd,sim}(\tau) - n_{act}(\tau)\|_2^2 \, d\tau,$$

wherein $n_{act}$ is the actual rotary speed of the actuator 3, e.g. a load machine. The target function J is minimised with respect to $n_{dmd,sim}$ and the result of this optimisation is used as the correction rotary speed n, as described above.

The determination of the third correction value $K_3$ can be carried out in a manner analogous to the determination of the first correction value $K_1$. To this end, again a target function J could be used as a linear function of two target functions. A first target function could be used again to evaluate the effect of the jerk energy or the acceleration energy ($J_{energy}$) as described above. The second target function could e.g. evaluate the rotation energy ($J_{disto}$) modified by the modified parameter P, here the inertia moment $J_W$, whereby mean value over time of the rotation energy modified by the modified parameter P is again supposed to be as low as possible, in order to minimise any falsification of the rotary speed, of the momentum or of the kinetic system energy. Thus, $J_{disto}$ could e.g. be written in the form $$J_{disto} = \int_{v=0}^t \int_{\tau=0}^v J_{cor}(\tau,v)\|\omega(\tau,v)\|_2^2 \, d\tau \, dv$$

or $$J_{disto} = \int_{v=0}^t \int_{\tau=0}^v J_{cor}(\tau,v)\omega(\tau,v) \, d\tau \, dv.$$

The target function J can then be optimised with respect to the third correction value $K_3$, here the correction inertia moment $J_{cor}$, by which the inertia moment $J_W$ is then corrected in the virtual component 5, or in the equation of motion in the simulation model of the virtual components 5, i.e. is added to $J_W$ with the correct sign.

A particular advantage during the optimisation of target functions for determining the correction values $K_1$, $K_2$, $K_3$ can be seen in the fact that during the optimisation, boundary conditions can be taken into account in a very simple manner, so that specified limitations of the virtual component 5, e.g. a maximum wheel speed, or the real component 4, e.g. a maximum rotary torque of an internal combustion engine, or of the actuator 3, e.g. a maximal rotary acceleration of an electric load machine, can be taken into account.

For example, the following boundary conditions could be taken into account for the determination of the first and third correction values $K_1$, $K_3$:

$$\omega(\tau) \leq \omega_{max}(t \leq \tau \leq t+T),$$

$$|\dot{\omega}(\tau)| \leq \dot{\omega}_{max}(t \leq \tau \leq t+T),$$

so that limit values for the rotary speed and the rotary acceleration, e.g. of the vehicle wheel or of the clutch, can be specified.

For the determination of the second correction value $K_2$, similar boundary conditions can be taken into account, e.g.

$$n_{act}(\tau) \leq n_{max}(t \leq \tau \leq t+T),$$

$$|\dot{n}_{act}(\tau)| \leq \dot{n}_{max}(t \leq \tau \leq t+T),$$

so that limit values for the rotary speed and the rotary acceleration can be specified.

There are well known methods for the optimisation of the above target function J, e.g. dynamic programming, receding horizon optimisation, and the like, which will not be explained here in more detail. The target function J is preferably optimised in real time, preferably on a real-time computer.

What is claimed is:

1. A method for reducing the excitation of vibrations and resonances in a test bed for a real component and a virtual component, wherein the real component provides a measured variable (M) of the real component to the virtual component and receives a control variable (S) for an actuator of the test bed from the virtual component, wherein a simulation model with an equation of motion is implemented in the virtual component, which calculates the control variable (S) from the measured variable (M) and the actuator adjusts the calculated control variable (S) on the test bed, wherein at least one of the following method steps a), b) or c) is set:

a) determining a first correction value ($K_1$) from the measured variable (M), wherein the first correction value ($K_1$) is added to the measured variable (M) and the sum is transferred as a corrected measured variable (M*) to the virtual component for calculating the control variable (S),
   b) determining a second correction value ($K_2$) from the calculated control variable (S), wherein the second correction value ($K_2$) is added to the calculated control variable (S) and the sum is transferred as a corrected control variable (S*) to the actuator,
   c) determining a third correction value ($K_3$) from the measured variable (M), wherein the third correction value ($K_3$) is used to modify a parameter (P) of the equation of motion and that for determining the first or the second or the third correction value ($K_1$, $K_2$, $K_3$), a target function (J) is implemented as a function of the first or the second or the third correction value ($K_1$, $K_2$, $K_3$), which is optimized with regard to the first or the second or the third correction value ($K_1$, $K_2$, $K_3$).

2. The method as claimed in claim 1, wherein the measured variable (M), and rotary torque ($T_W$) of a connection shaft between the real component and the actuator is used.

3. The method as claimed in claim 1, wherein a rotary speed (n) is used as the control variable (S).

4. The method as claimed in claim 1, wherein for determining the first or the third correction value ($K_1$, $K_3$), a linear combination of a first and a second target function ($J_{energy}$, $J_{disto}$) is used as the target function (J).

5. The method as claimed in claim 4, wherein as the first target function ($J_{energy}$), a square objective function is used as a function of angular speed ($\omega$) or a derivative thereof.

6. The method as claimed in claim 4, wherein the second target function ($J_{disto}$) is used to evaluate angular momentum additionally introduced by the first correction value ($K_1$).

7. The method as claimed in claim 4, wherein the second target function ($J_{disto}$) is used to evaluate kinetic energy modified by the third correction value ($K_3$).

8. The method as claimed in claim 1, wherein a correction torque ($T_{cor}$) is determined as the first correction value ($K_1$).

9. The method as claimed in claim 1, wherein a correction inertia moment ($J_{cor}$) is determined as the third correction value ($K_3$).

10. The method as claimed in claim 1, wherein for determining the second correction value ($K_2$), a target function (J) is implemented which evaluates the deviation between the control variable (S) calculated in the virtual component and a control variable actual value ($S_{act}$).

11. The method as claimed in claim 10, wherein a correction rotary speed ($n_{cor}$) is calculated as the second correction value ($K_2$) by optimising the correction rotary speed ($n_{cor}$) with respect a rotary speed calculated in the virtual component ($n_{dmd,sim}$), and a determined rotary speed ($n_{act}$).

12. The method as claimed in claim 1, wherein during the optimization, boundary conditions are used for taking into account specified limitations of the virtual component or of the real component or of the actuator.

13. The method as claimed in claim 5, wherein the first target function is $$J_{energy} = \frac{1}{2} J_W \int_{\tau=t}^{t+T} \|\dot\omega(\tau)\|_2^2 d\tau$$

or $$J_{energy} = \frac{1}{2} J_W \int_{\tau=t}^{t+T} \|\omega(\tau)\|_2^2 d\tau.$$

14. The method as claimed in claim 6, wherein the second target function is $$J_{disto} = \int_{v=0}^{t} \int_{\tau=0}^{v} \frac{T_{cor}(\tau, v)}{J_W} d\tau dv.$$

15. The method as claimed in claim 7, wherein the second target function is $$J_{disto} = \int_{v=0}^{t} \int_{\tau=0}^{v} J_{cor}(\tau, v) \|\omega(\tau, v)\|_2^2 d\tau dv.$$

16. The method as claimed in claim 7, wherein the second target function is $$J_{distro} = \int_{v=0}^{t} \int_{\tau=0}^{v} J_{cor}(\tau, v) \omega(\tau, v) d\tau dv.$$

17. The method as claimed in claim 10, wherein the target function is $$J = \int_0^t \|S(\tau) - S_{act}(\tau)\|_2^2 d\tau.$$

18. The method as claimed in claim 11, the correction rotary speed ($n_{cor}$) is calculated by $$J = \int_0^t \|n_{dmd,sim}(\tau) - n_{act}(\tau)\|_2^2 d\tau,$$

* * * * *